United States Patent [19]

Gonzales et al.

[11] Patent Number: 4,527,757

[45] Date of Patent: Jul. 9, 1985

[54] LIFT GENERATING MECHANISM FOR AN AIRCRAFT

[76] Inventors: Gilbert R. Gonzales, 677 Creed Ave., Las Cruces, N. Mex. 88005; John A. La Monica, Jr., 1607 N. Euclid, Tucson, Ariz. 85719

[21] Appl. No.: 279,184

[22] Filed: Jun. 30, 1981

[51] Int. Cl.³ .................... B64C 39/00; B64C 27/00
[52] U.S. Cl. .................................. 244/20; 244/19; 244/9; 244/70
[58] Field of Search ................ 416/7, 8; 417/320; 415/5; 244/19, 20, 9, 70; 440/94, 95, 96, 97

[56] References Cited

U.S. PATENT DOCUMENTS

| | | | |
|---|---|---|---|
| 1,632,811 | 6/1927 | Watter | 244/20 |
| 2,739,768 | 3/1956 | Purpura | 244/20 |

FOREIGN PATENT DOCUMENTS

| | | | |
|---|---|---|---|
| 410848 | 11/1909 | France | 244/70 |
| 945410 | 5/1949 | France | 244/20 |

Primary Examiner—Trygve M. Blix
Assistant Examiner—Rodney A. Corl
Attorney, Agent, or Firm—Cahill, Sutton & Thomas

[57] ABSTRACT

A lift generating mechanism includes a plurality of airfoils each having first and second end surfaces, first and second side surfaces, and a centerline extending between the first and second side surfaces. The airfoil section lying between the first end surface and the centerline is a mirror image of the airfoil section lying between the second end surface and the centerline. A coupling link extends outward from each of the side surfaces of each airfoil. Each connecting link is coupled to an oval shaped guide track and to a larger oval shaped drive chain. The guide tracks and the drive chains are positioned such that first and second transition regions are provided at opposite ends of the oval path through which the airfoils are translated. The spacing between the drive chains and the guide tracks is controlled such that each airfoil is deflected in a first rotational direction as it passes through the first transition region so that each airfoil presents a positive angle of incidence as it traverses a first horizontal path segment in which the first end surface of each airfoil functions as a leading edge. Each airfoil is deflected in a second rotational direction as it passes through the second transition region such that each airfoil presents a positive angle of incidence as it traverses a second horizontal path segment in which the second end surface of each airfoil functions as a leading edge. In this manner, each airfoil generates positive lift as it transits both the first and second horizontal path segments which are defined by the oval shaped tracks.

7 Claims, 16 Drawing Figures

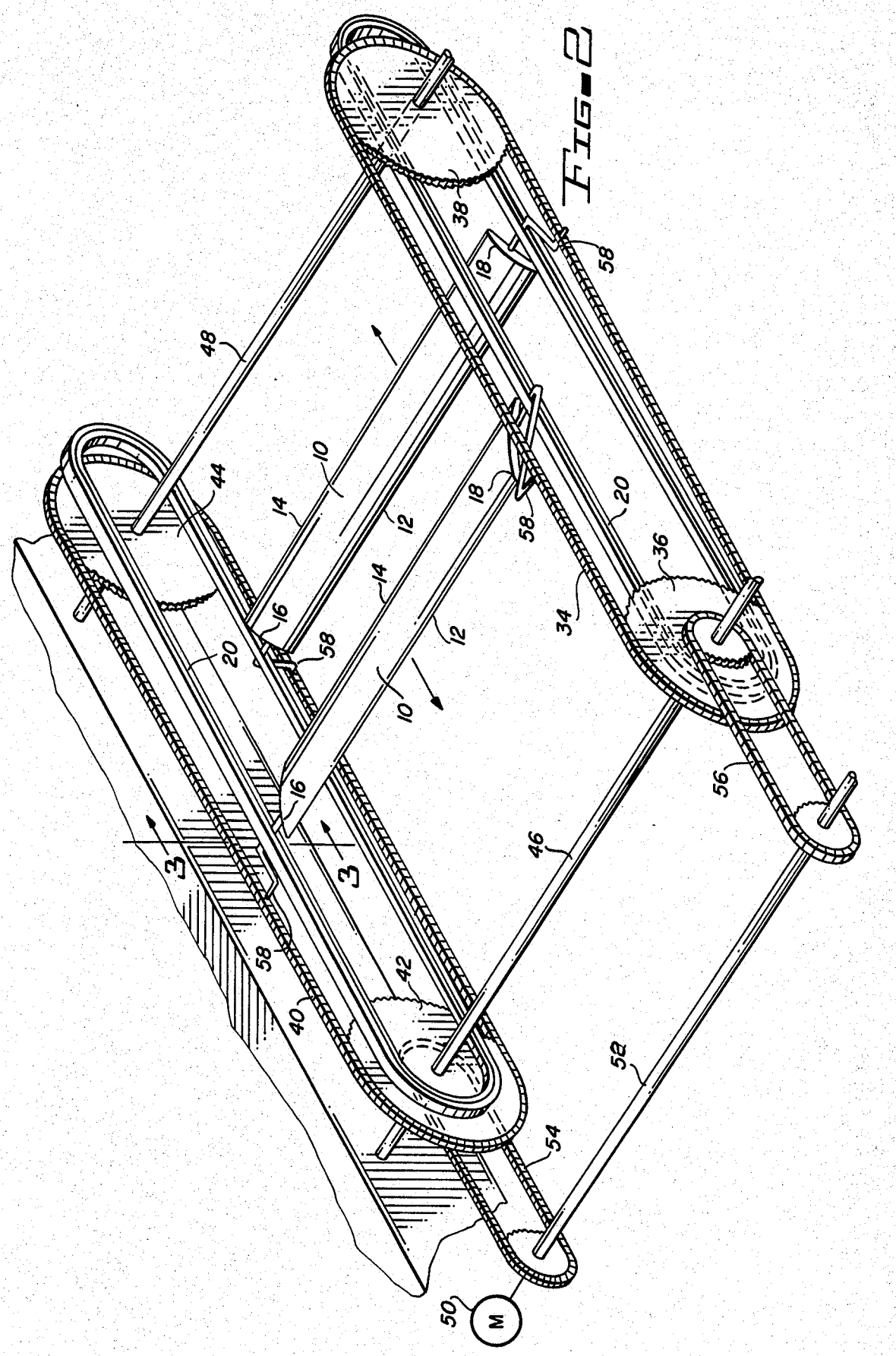

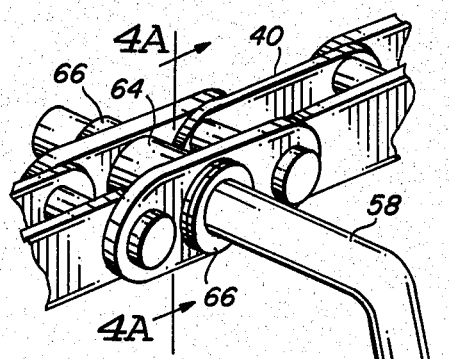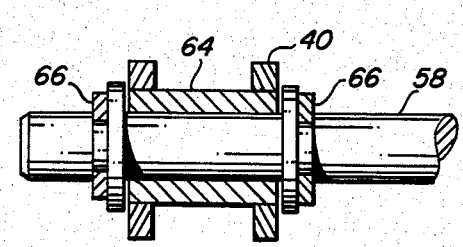
FIG-4A
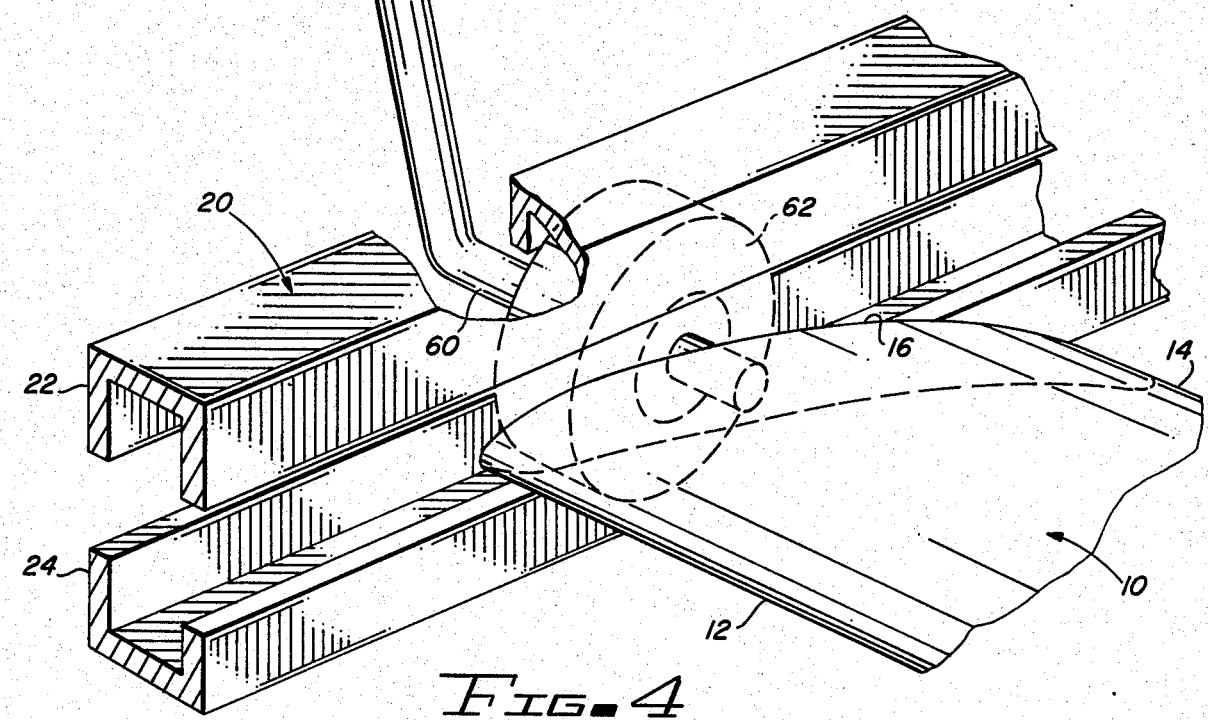
FIG-4
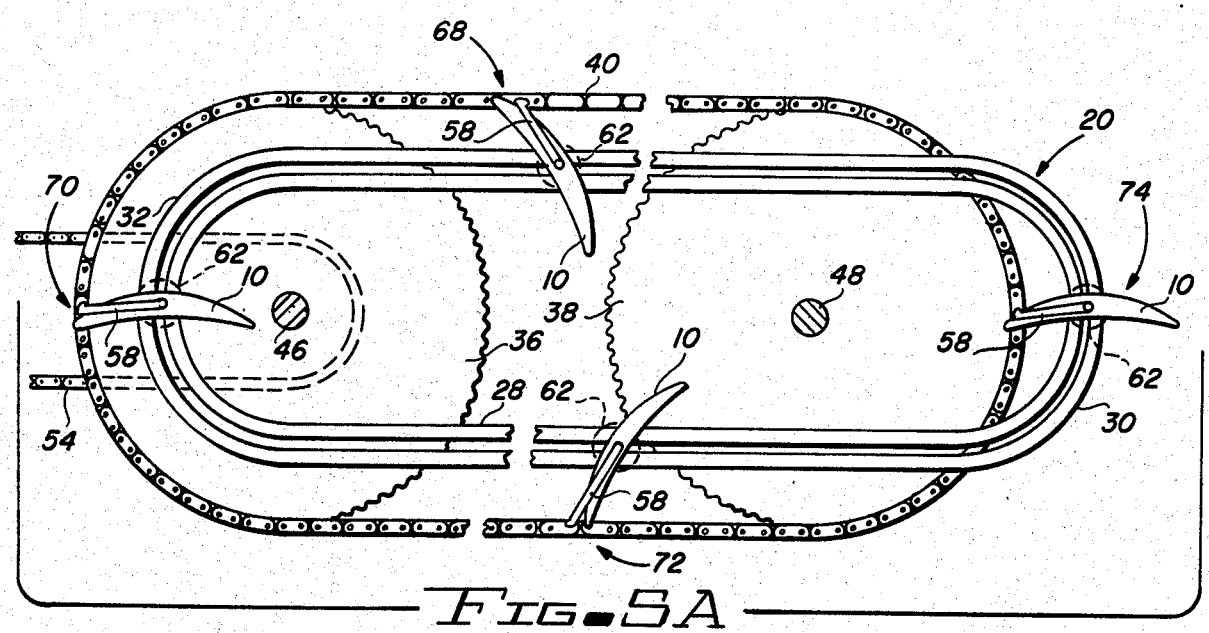
FIG-5A

LIFT GENERATING MECHANISM FOR AN AIRCRAFT

BACKGROUND OF THE INVENTION

1. Field of the Invention

The present invention relates to aircraft lift generating mechanisms, and more particularly, to aircraft lift generating mechanisms which include a plurality of airfoils driven in a single direction around an oval-shaped path.

2. Description of the Prior Art

A number of different devices have been proposed for generating lift by causing a plurality of airfoils to be rotated in a single direction through an oval path.

U.S. Pat. No. 4,166,595 (Ango) discloses a variable lift advancing wing aircraft which includes a plurality of independant airfoil sections coupled together by a chain and driven in a single direction through a rotary path. A complex mechanical arrangement is provided to deform the airfoil into a highly cambered lift-generating configuration as each airfoil is translated across an upper horizontal path segment of the oval-shaped path. As each airfoil is translated beyond the upper horizontal section of the oval-shaped path, the camber of the airfoil is permitted to return to its undeflected, less highly cambered configuration in which very little lift is generated. As each airfoil is translated rearward along a lower horizontal path segment, a small amount of negative lift is produced which lessens the net overall lift. The angle of incidence of each airfoil is maintained nearly constant at a zero angle as the airfoil is translated forward across the upper horizontal path segment and rearward across the lower horizontal path segment. A highly complex arrangement of mechanical elements is required to implement the complex variable lift advancing wing aircraft disclosed by Ango.

U.S. Pat. No. 4,113,205 (Shaw) discloses an aerodynamic lifting mechanism which includes a plurality of airfoils mounted on two continuous toothed belts. In the non-lift-generating mode of operation, each of the plurality of symmetrical airfoils is maintained at a zero angle of incidence such that a zero net lift is produced as the airfoils are continuously rotated in a single direction through an oval path. The leading edge of each symmetrical airfoil is continuously advanced in a single direction. When the pilot of the Shaw device desires to produce positive lift, he activates a flight control mechanism which increases the angle of incidence of the airfoils to provide a controllable amount of net lift.

SUMMARY OF THE INVENTION

It is therefore a primary object of the present invention to provide a lift generating mechanism for an aircraft which includes a plurality of airfoils that can be deflected as they are driven in a single direction around an oval shaped path to produce lift as each airfoil transits both the upper and lower horizontal sections of the oval path.

Another object of the present invention is to provide a lift generating mechanism for an aircraft which can permit the aircraft to have a vertical take-off and landing capability.

Yet another object of the present invention is to provide a lift generating mechanism for an aircraft which can control the amount of lift produced by varying the angle of incidence of the airfoils as they transit both the upper and lower horizontal path segments of the oval-shaped path.

Briefly stated, and in accord with one embodiment of the invention, a lift generating mechanism for an aircraft comprises a plurality of airfoils each of which includes first and second end surfaces, first and second side surfaces, and a centerline extending between the first and second side surfaces. The airfoil section lying between the first end surface and the centerline represents a mirror image of the airfoil section lying between the second end surface and the centerline. Drive means is coupled to the aircraft and to the first and second side surfaces of each airfoil to drive each airfoil in a single rotational direction through an oval path. The oval path includes a first horizontal path segment and a second horizontal path segment positioned below the first horizontal path segment. The oval path further includes first and second transition regions. Means is coupled to each airfoil for deflecting each airfoil in a first rotational direction as it passes through the first transition region such that each airfoil presents a positive angle of incidence as it traverses the first horizontal path segment and the first end surface of each airfoil functions as a leading edge. The deflecting means also deflects each airfoil in a second rotational direction as it passes through the second transition region such that each airfoil presents a positive angle of incidence as it traverses the second horizontal path segment and the second end surface of each airfoil functions as a leading edge. In this manner, each airfoil generates positive lift as it transits both first and second horizontal segments of the oval path.

DESCRIPTION OF THE DRAWINGS

The invention is pointed out with particularity in the appended claims. However, other objects and advantages together with the operation of the invention in its various embodiments may be better understood by reference to the following detailed description taken in conjunction with the following illustrations wherein:

FIG. 2 is a partially cut away perspective view of certain elements of the lift generating mechanism of the present invention. A number of individual airfoil sections have been deleted from this figure to more clearly illustrate other elements of the present invention.

FIG. 4 represents a partially cut away, enlarged perspective view of an end of a single airfoil, a portion of the oval-shaped guide track, and a section of the drive chain for the purpose of illustrating the interconnection between these three elements.

FIG. 4A is a sectional view of the drive chain illustrated in FIG. 4, taken along section line 4A—4A.

FIG. 5A represents a simplified illustration of the lift generating mechanism depicted in FIG. 2, taken from a point lying between the two drive chains of the present invention.

DESCRIPTION OF THE PREFERRED EMBODIMENT

Figure 1:
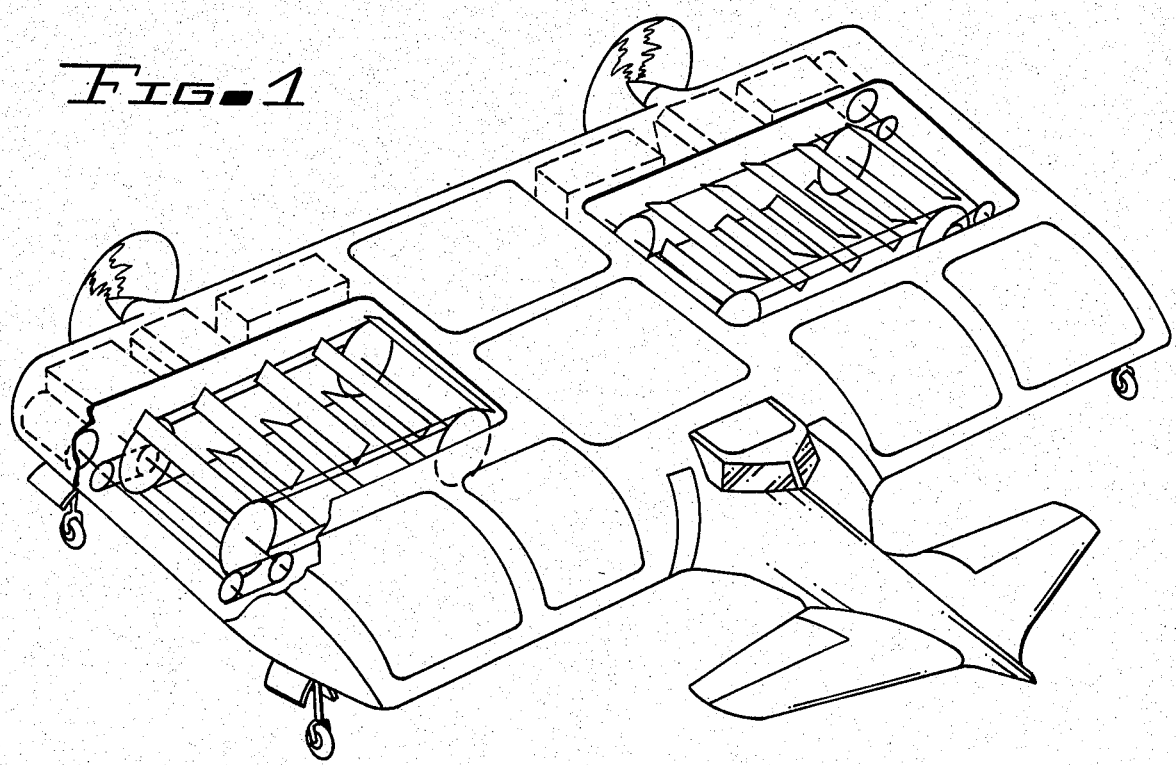
FIG. 1 is a perspective view of an aircraft including a symmetrically positioned set of lift generating mechanism in accordance with the present invention.
Figure 3A:
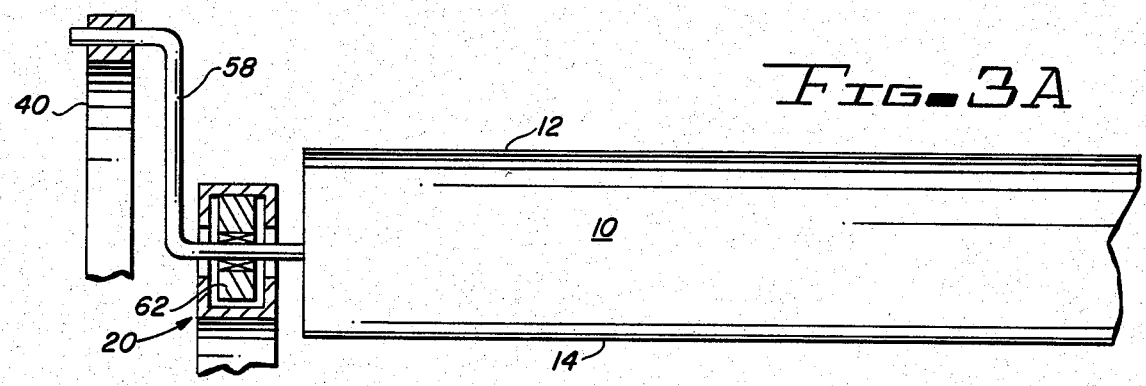
FIGS. 3A and 3B comprise a partially cut away elevational view of the lift generating mechanism illustrated in FIG. 2, taken along section line 3—3, particularly illustrating the end sections of two airfoils shown in different positions along the oval-shaped guide track.
Figure 3B:
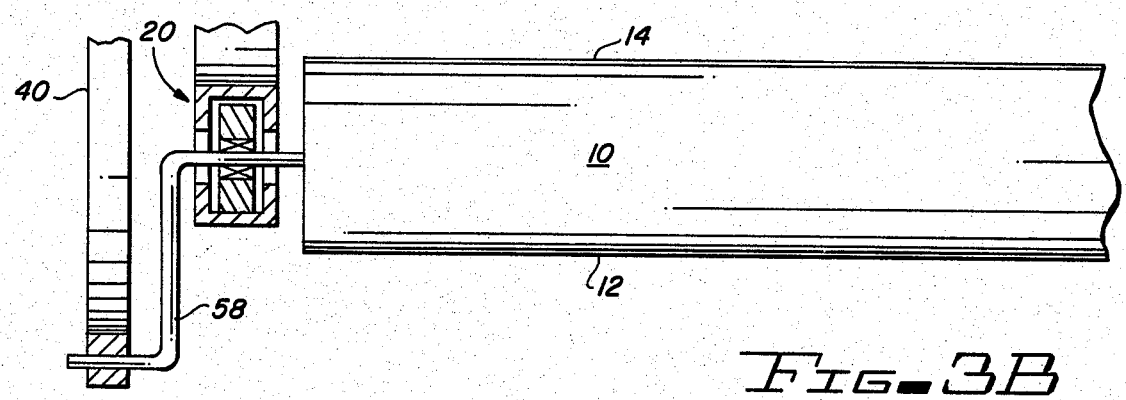

In order to better illustrate the advantages of the present invention and its contributions to the art, one basic embodiment of the invention and certain modifications thereof will now be described in detail.

Referring now to FIGS. 1–5 in general, the lift generating mechanism of the present invention includes a plurality of airfoils 10 each of which includes a first side surface 16 and a second side surface 18. The centerline of each airfoil is oriented parallel to first side surface 16 and second side surface 18 and bisects the distance between side surfaces 16 and 18. Each airfoil also includes a first end surface 12 and a second end surface 14. The airfoil section lying between the first end surface 12 and the centerline is a mirror image of the airfoil section lying between the second end surface 14 and the airfoil centerline.

An oval track 20 is positioned adjacent to the side surfaces of each airfoil as illustrated. Each oval track 20 includes an upper track element 22 and a lower track element 24 each of which is coupled to the aircraft to transmit the lift generated by each airfoil to the aircraft. The horizontally oriented upper section of each oval track 20 defines a first horizontal path segment 26 while the lower horizontally oriented portion of each oval track defines a second horizontal path segment 28. First transition region 30 and second transition region 32 represent the curved sections of oval track 20 which couple together first horizontal path segment 26 with second horizontal path segment 28.

A first chain 34 forms an oval path around first sprocket wheel 36 and second sprocket wheel 38. A second chain 40 forms an oval path around third sprocket wheel 42 and fourth sprocket wheel 44. The oval path formed by first chain 34 and second chain 40 are identical in size and are larger in size than oval track 20. Shafts 46 and 48 are rotatably coupled to the body of the aircraft.

Chains 34 and 40 are rotated in unison by a drive mechanism which comprises motor 50, drive shaft 52 and drive chains 54 and 56. Drive chains 54 and 56 are each coupled to a pair of drive sprockets which are rigidly coupled to shaft 46 and drive shaft 52. The rate of rotation of chains 34 and 40 is controlled by the operating R.P.M. of motor 50.

Referring now specifically to FIGS. 4 and 4A, an S-shaped arm 58 couples the end 16 of an airfoil 10 both to oval track 20 and to chain 40. The lower end 60 of arm 58 is rigidly coupled to end 16 of airfoil 10. In addition, lower end 60 functions as an axle which is coupled by a ball bearing assembly to a roller 62 which rests upon and rotatably engages oval track 20. If drive chain 40 includes a reasonable amount of slack and if each airfoil 10 is functioning to generate a normal amount of lift, roller 62 will typically engage upper track element 22 as the airfoil is translated in a single direction along first horizontal path segment 26 and will also engage the upper track element 22 of second horizontal path segment 28 of oval track 20. However, if chain 40 is stretched very tightly, the tension force exerted by chain 40 through arm 58 onto roller 62 may cause roller 62 to contact and roll against lower track element 24 as airfoil 10 is translated along second horizontal path segment 28. The spacing between upper track element 22 and lower track element 24 must be adjusted to maintain a small gap between roller 62 and the upper and lower elements of oval track 20.

The outer, horizontally oriented section of arm 58 extends through a cylindrical housing or bearing surface 64 in chain 40 to permit free rotation of arm 58 with respect to housing 64. A pair of snap rings indicated by reference number 66 engage slotted recesses in the horizontal extention of arm 58 to permit free rotational movement of arm 58 with respect to bearing 64 while preventing relative lateral translation between these two members.

In FIG. 5A, four airfoils are illustrated in different positions along oval track 20. The airfoil indicated by reference number 68 is being translated from right to left through first horizontal path segment 26. Airfoil 68 is being pulled along by arm 58 which is coupled to chain 40. Airfoil 68 generates positive lift as a result of the positive angle of incidence, which typically may be maintained at around twenty-five to thirty degrees The airfoil indicated by reference number 70 is shown transiting the second transition region 32. As a result of the different radial positions of chain 40, oval track 20, and roller 62, roller 62 has become approximately aligned with the upper section of arm 68 which is coupled to chain 40. In this position, arm 40 is transitioning from a pulling relationship between chain 40 and roller 62 to a pushing relationship. The inertia of airfoil 70 at this very narrowly defined transition point facilitates the transition from a pulling relationship to the desired pushing relationship.

Reference number 72 illustrates an airfoil and its associated roller 62 which have advanced to a point lying ahead of the point at which arm 58 is coupled to chain 40. In this configuration, chain 40 through arm 58 is imparting a pushing force on airfoil 72 to maintain continuous counterclockwise rotation of the airfoil and to maintain the desired positive angle of incidence of the airfoil for the purpose of generating lift as airfoil 72 is translated along second horizontal path segment 28 in a direction opposite to the direction of translation of airfoil 68 along first horizontal path segment 26.

The airfoil indicated by reference number 74 is illustrated undergoing a second transition from a pushing relationship to a pulling relationship as was described in connection with the transition of airfoil 70. Once again, the inertia of airfoil 70 and the relative radial distances and curvature between oval track 20 and drive sprocket 38 facilitates this transition.

Figure 6A:
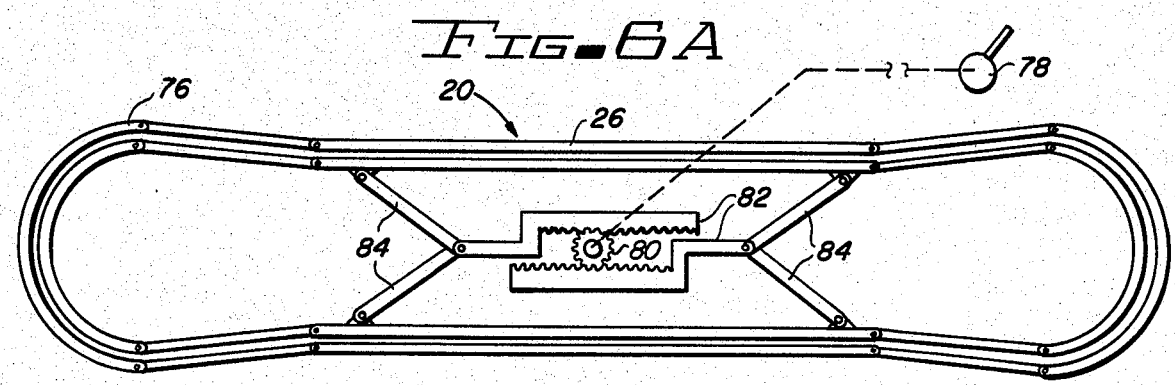
FIGS. 6A and 6B depict two positions of a pilot controllable mechanism for altering the angle of incidence of the airfoils of the present invention.
Figure 6B:
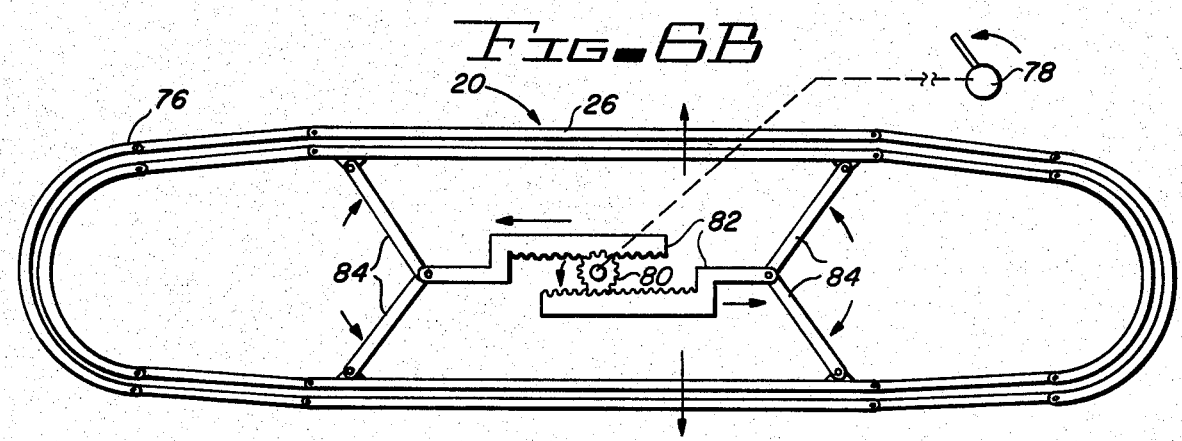

Referring now to FIGS. 6, 7 and 8, a more sophisticated version of the present invention is disclosed which permits the angle of incidence of airfoil 10 to be adjusted by the pilot to produce either increased or decreased lifting forces. In this embodiment, oval track 20 includes a plurality of articulated joints, such as joint 76 which permits the vertical spacing between first horizontal path segment 26 and second horizontal path segment 28 to be varied by the aircraft pilot. A pilot-actuated lever 78 is coupled to a drive gear 80 and permits a pilot to horizontally displace a pair of control arms indicated generally by reference number 82 between a first position illustrated in FIG. 6A and a second position illustrated in FIG. 6B. As control arms 82 are deflected into the position illustrated in FIG. 6B, linkage rods illustrated generally by reference number 84 are displaced as shown and cause first horizontal path segment 26 and second horizontal path segment 28 to be separated by an increased spacing.

Figure 7A:
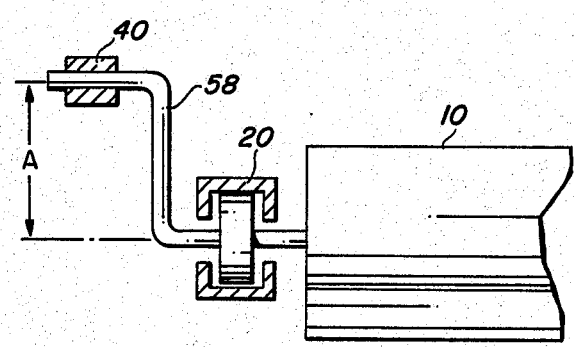
FIGS. 7A and 7B illustrate the manner in which the apparatus depicted in FIGS. 6A and 6B operates to alter the angle of incidence of the airfoils of the present invention.
Figure 8A:
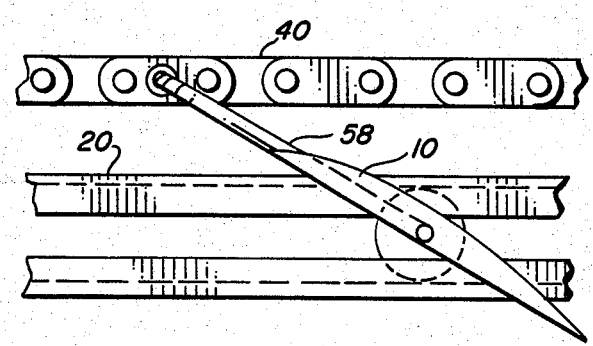
FIGS. 8A and 8B depict the manner in which the apparatus depicted in FIGS. 6A and 6B operates to alter the angle of incidence of the airfoils of the present invention.
Figure 7B:
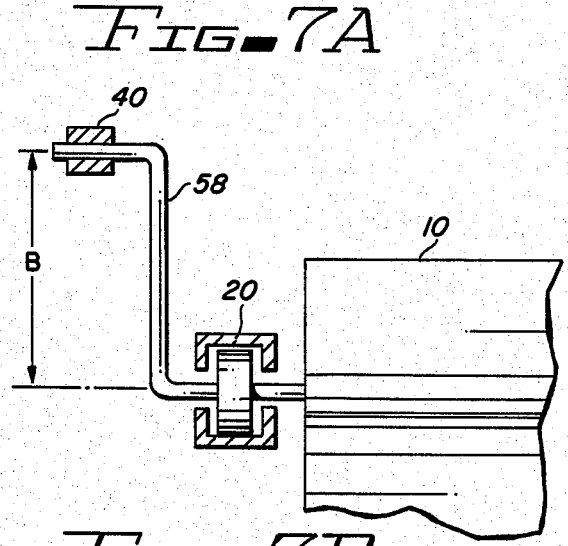
Figure 8B:
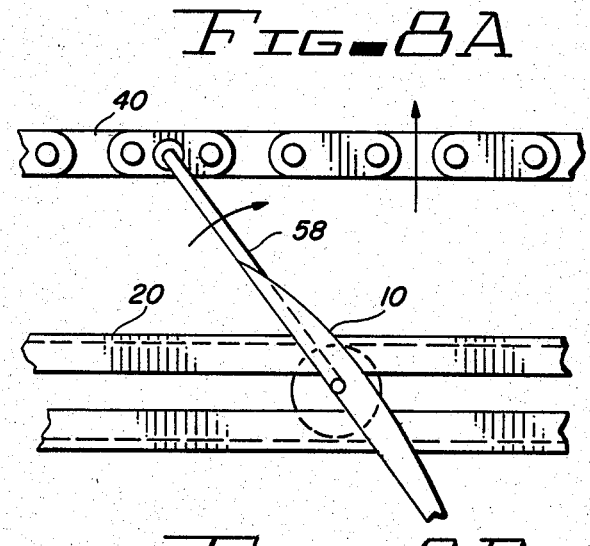

FIGS. 7A and 8A illustrate linkage rods 84 in the position illustrated in FIG. 6B, while FIGS. 7B and 8B correspond to the position of linkage rods 84 depicted in FIG. 6A. As is readily apparent, the pilot induced decrease in spacing between first horizontal path segment 26 and second horizontal path segment 28 increases the spacing between chain 40 and oval track 20 and causes the angle of incidence of airfoil 10 to be increased by an amount corresponding to the change in spacing between chain 40 and oval path 20. In this manner a pilot can continuously control the amount of lift generated by the lift generating mechanism of the present invention by merely controlling the spacing between chain 40 and oval track 20. An equivalent result could be achieved by maintaining oval track 20 in a fixed position and utilizing mechanical means to modify the position of drive chain 40 with respect to oval track 20. Although it is only necessary to change the angle of incidence of the airfoil transiting either first horizontal path segment 26 or second horizontal path segment 28 in order to vary the amount of lift produced by the lift generating mechanism of the present invention, the maximum change in lift will be produced by an apparatus which symmetrically changes the angle of incidence of both the airfoils transiting the first horizontal path segment 26 as well as the second horizontal path segment 28. Other means for modifying the lift generated by the lift generating mechanism of the present invention will be readily apparant to one of ordinary skill in the art.

Figure 9:
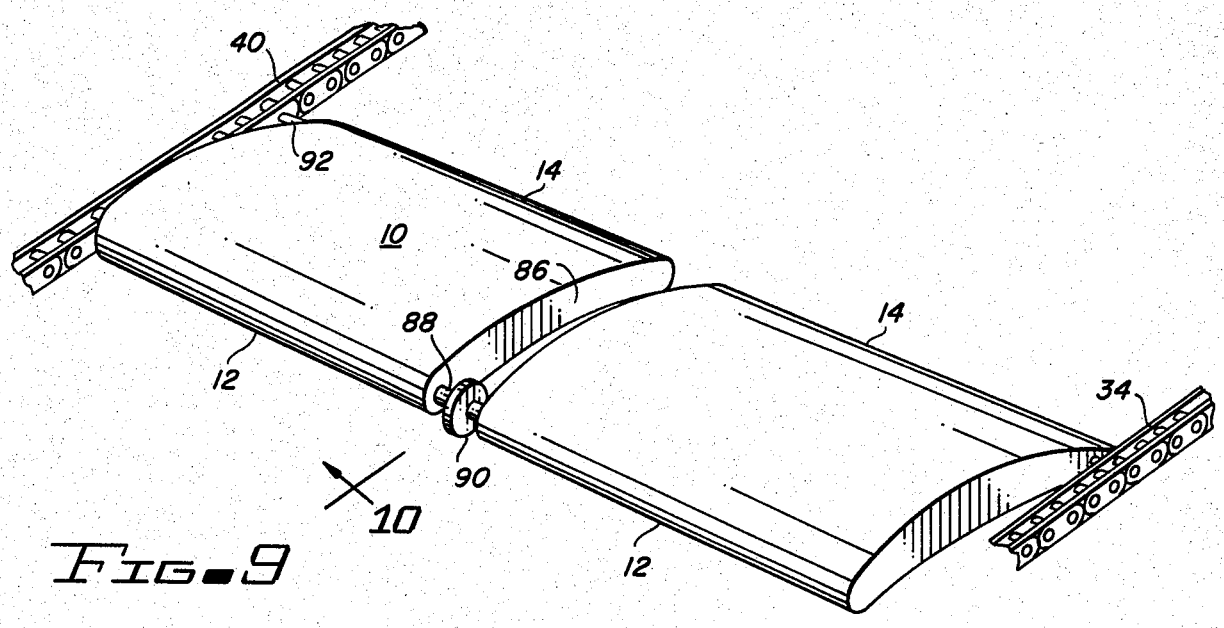
FIG. 9 partially depicts a second preferred embodiment of the present invention in which each airfoil is coupled to a single, centerally located oval-shaped guide track.
Figure 10:
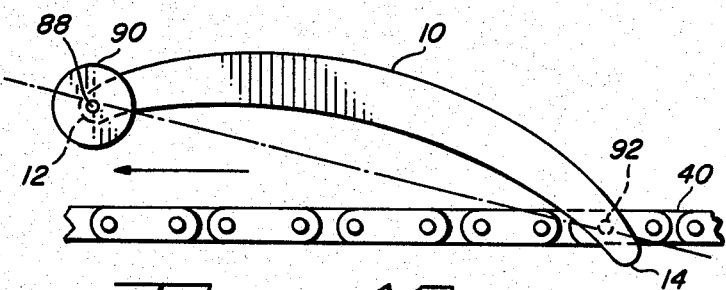
FIG. 10 represents a sectional view of the airfoil illustrated in FIG. 9, taken along section line 10—10.
Figure 11:
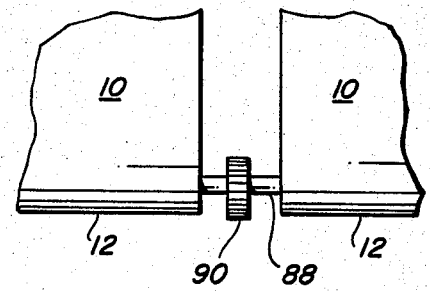
FIG. 11 represents a view from above of a section of the airfoil illustrated in FIG. 9.

Referring now to FIGS. 9, 10 and 11, a second slightly modified version of the present invention is disclosed. In this embodiment, each airfoil 10 includes a slot 86 positioned at the midpoint of the airfoil. An axle 88 is coupled across the forward section of slot 86 and supports a roller 90 of the type disclosed earlier. A single oval track 20 (not shown) of a construction identical to that described above engages roller 90 and serves to assist in controlling the angle of incidence of airfoil 10 as it is translated in a single direction around the oval track. A straight shaft 92 is rigidly coupled to and extends outward from the extreme end of each side surface of airfoil 10 to rotatably engage a cylindrical housing or bearing surface 64 of the type disclosed in FIG. 4A.

It will be apparant to those skilled in the art that the disclosed lift generating mechanism may be modified in numerous different ways and may assume many embodiments other than the preferred forms specifically set out and described above. Accordingly, it is intended by the appended claims to cover all such modifications of the invention which fall within the true spirit and scope of the invention.

I claim:

1. A lift generating mechanism for an aircraft comprising:
   a. a plurality of airfoils each having first and second end surfaces, first and second side surfaces and a centerline extending between the first and second side surfaces, the airfoil section lying between the first end surface and the centerline being a mirror image of the airfoil section lying between the second end surface and the centerline;
   b. means coupled to the aircraft and to the first and second side surfaces of each airfoil for driving each airfoil in a single rotational direction through an oval path including a first horizontal path segment and a second horizontal path segment positioned below the first horizontal path segment, the oval path further including first and second transition regions wherein said drive means includes
      (i) a first chain forming a first oval path around first and second sprocket wheels;
      (ii) a second chain forming a second oval path around third and fourth sprocket wheels;
      (iii) a first axle coupling together the first and third sprocket wheels;
      (iv) a second axle coupling together the second and fourth sprocket wheels;
      (v) said first and second oval paths formed by the first and second chains each including a first displaced horizontal path segment lying above the first horizontal path segment traversed by the airfoils and a second displaced horizontal path segment lying below the second horizontal path segment traversed by the airfoils;
   c. means coupled to each airfoil for deflecting each airfoil in a first rotational direction as it passes through the first transition region such that each airfoil presents a positive angle of incidence as it traverses the first horizontal path segment wherein the first end surface of each airfoil functions as a leading edge and for deflecting each airfoil in a second rotational direction as it passes through the second transition region such that each airfoil presents a positive angle of incidence as it traverses the second horizontal path segment wherein the second end surface of each airfoil functions as a leading edge;
   d. an oval shaped track coupled to the aircraft and including a roller unit coupled to each airfoil for guiding the airfoils around the oval path, said roller unit including
      (i) an axle;
      (ii) a roller rotatably coupled to the axle and contacting the oval shaped track; and
      (iii) a link rigidly coupled at one end to the axle and pivotally coupled at the opposite end to one of the chains;

whereby each airfoil generates positive lift as it transits both the first and second horizontal path segments of the oval path.

2. The lift generating mechanism of claim 1 wherein said guide means includes an oval shaped track.

3. The lift generating mechanism of claim 1 wherein the oval path formed by the first and second chains are equal in size.

4. The lift generating mechanism of claim 1 wherein said drive means further includes means coupled to the first shaft to translate the first and second chains around the oval paths formed by the chains.

5. The lift generating mechanism of claim 1 wherein the plane formed by the intersection of the link and the axle is oriented parallel to the chord line of each airfoil.

6. A lift generating mechanism for an aircraft comprising:
   a. a plurality of airfoils each having first and second end surfaces, first and second side surfaces and a centerline extending between the first and second side surfaces, the airfoil section lying between the first end surface and the centerline being a mirror image of the airfoil section lying between the second end surface and the centerline;
   b. a first chain coupled to the first side surface of each airfoil and passing around first and second sprocket wheels to form a first oval path and a second chain coupled to the second side surface of each airfoil and passing around third and fourth sprocket wheels to form a second oval path for driving each airfoil in a single rotational direction through an oval path including a first horizontal path segment and a second horizontal path segment positioned below the first horizontal path segment, the oval path further including first and second transition regions;
   c. first and second oval shaped tracks coupled to the aircraft and positioned respectively between the first chain and the first end surface of each airfoil and the second chain and the second end surface of each airfoil for guiding the airfoils around the first and second oval paths;
   d. a roller unit coupled to each airfoil and contacting the guide means for coupling each airfoil to the guide means; and
   e. means coupled to said guide means and to each airfoil for deflecting each airfoil in a first rotational direction as it passes through the first transition region such that each airfoil presents a positive angle of incidence as it traverses the first horizontal path segment wherein the first end surface of each airfoil functions as a leading edge and for deflecting each airfoil in a second rotational direction as it passes through the second transition region such that each airfoil presents a positive angle of incidence as it traverses the second horizontal path segment wherein the second end surface of each airfoil functions as a leading edge; whereby each airfoil generates positive lift as it transits both the first and second horizontal path segments of the oval path.

7. The lift generating mechanism of claim 6 wherein the oval path formed by the first and second chains are equal in size.

* * * * *